(12) United States Patent
Kodaira et al.

(10) Patent No.: US 6,173,802 B1
(45) Date of Patent: Jan. 16, 2001

(54) ELECTRIC POWER STEERING DEVICE

(75) Inventors: Tadao Kodaira, Maebashi; Tsugio Onodera, Gunma; Susumu Aoki, Kiryu, all of (JP)

(73) Assignee: Mitsuba Corporation, Gunma-ken (JP)

( * ) Notice: Under 35 U.S.C. 154(b), the term of this patent shall be extended for 0 days.

(21) Appl. No.: 09/415,360

(22) Filed: Oct. 8, 1999

Related U.S. Application Data

(63) Continuation of application No. 08/887,153, filed on Jul. 2, 1997.

(30) Foreign Application Priority Data

Jul. 11, 1996 (JP) .................................................... 8-201233

(51) Int. Cl.⁷ ........................................................ B62D 5/04
(52) U.S. Cl. ............................................................ 180/444
(58) Field of Search ...................... 180/443, 444, 180/445, 446

(56) References Cited

U.S. PATENT DOCUMENTS

| | | | | |
|---|---|---|---|---|
| 4,577,715 | * | 3/1986 | Saito .................................... | 180/444 |
| 4,660,671 | * | 4/1987 | Behr et al. ........................... | 180/446 |
| 5,482,128 | * | 1/1996 | Takaoka et al. ..................... | 180/444 |
| 5,555,951 | * | 9/1996 | Sugino et al. ....................... | 180/444 |
| 5,590,732 | * | 1/1997 | Sugino et al. ....................... | 180/444 |
| 5,650,701 | * | 7/1997 | Shimizu et al. ..................... | 318/489 |
| 5,685,390 | * | 11/1997 | Chikuma et al. .................... | 180/444 |
| 5,738,181 | * | 4/1998 | Kato .................................... | 180/400 |
| 5,864,189 | * | 1/1999 | Kodaira et al. ...................... | 310/89 |

* cited by examiner

*Primary Examiner*—Kevin Hurley
(74) *Attorney, Agent, or Firm*—Marshall & Melhorn

(57) ABSTRACT

In an electric power steering device, a yoke made of a tubular member and carrying permanent magnets, and a hollow motor shaft coaxially and rotatably received in the yoke to carry a motor armature which cooperates with the permanent magnets to form an electric motor for the power steering device, a section of the yoke extending from an axial end thereof to a part thereof surrounding an axial end of the motor shaft defines an inner diameter which is greater than an outer diameter of the nut member so that the output torque of the electric motor can be measured during the course of assembling the power steering device by allowing a testing tool to be inserted from the open end of the yoke without any interference and to be applied to a suitable part of the nut member or the motor shaft. Thus, the performance of the electric motor can be directly evaluated before the power steering device is fully assembled so that any faulty electric motor can be either rejected or repaired before any further assembling work is conducted.

9 Claims, 5 Drawing Sheets

ELECTRIC POWER STEERING DEVICE

CROSS-REFERENCE TO RELATED APPLICATION

This application is a continuation of U.S. patent application Ser. No. 08/887,153 filed Jul. 2, 1997, which claims priority of Japanese patent application No. 08-201233 filed Jul. 11, 1996.

FIELD OF THE INVENTION

The present invention relates to an electric power steering device, and in particular to an electric power steering device having a hollow motor shaft, and a drive shaft coaxially received therein and adapted to be axially actuated via a ball nut arrangement interposed between them.

BACKGROUND OF THE INVENTION

According to a known electric power steering device for motor vehicles, the motor shaft consists of a hollow shaft, and a drive shaft connected to the right and left steerable wheels via tie rods is coaxially received in the motor shaft. A ball nut arrangement is interposed between the hollow motor shaft and the drive shaft for converting the rotational movement of the hollow motor shaft into the axial movement of the drive shaft.

In such an electric power steering device, the electric motor must have a required level of performance for the electric power steering device to operate in a satisfactory manner. However, once the power steering device is fully assembled, it is not practical to replace or repair the electric motor even if the electric motor is found to be faulty or otherwise incapable of producing a required level of performance. Therefore, it has been a common procedure in the manufacturing of electric power steering devices to test the operation of the electric motor as a part of the assembling process.

FIG. 6 illustrates a conventional electric power steering device which comprises a yoke 1 consisting of an axially elongated tube member serving also as a part of the housing for the power steering device, and a gear casing which accommodates a rack and pinion gear device and coaxially attached to the yoke 1 via a radial flange to form the rest of the housing for the power steering device. The power steering device normally extends laterally across the vehicle body which is not shown in the drawing, and is attached to the vehicle body via a bracket 2a formed in the gear casing 2 and a mounting bracket 13 partly surrounding a small diameter portion of the yoke 1. These brackets 2a and 13 are normally secured to the vehicle body by fasteners such as threaded bolts.

The yoke 1 and the gear casing 2 thus jointly form the housing for the power steering device, and coaxially receive therein a drive shaft 3 which is axially slidable so as to steer the right and left front wheels via the tie rods attached to either axial end thereof. The drive shaft 3 is connected to the rack of a rack and pinion gear device, and the pinion thereof is attached to a pinion shaft 4 which is connected to a steering shaft.

An intermediate part of the drive shaft 3 is coaxially received in a hollow motor shaft 5. A motor armature core 6a and a commutator 6b are attached to the outer circumferential surface of the hollow motor shaft 5 so that the armature core 6a and the hollow motor shaft 5 rotate integrally together. A ball nut mechanism is interposed between the inner circumferential surface of the hollow motor shaft 5 and the outer circumferential surface of the drive shaft 3 to convert the rotational movement of the hollow motor shaft 5 to the axial movement of the drive shaft 3. The rotational torque produced from the motor armature 6 is converted into the axial assist force for the drive shaft 3 so that the effort required for turning the steering wheel attached to the pinion shaft 4 may be reduced.

According to this electric power steering device, the outer diameter of the ball nut is greater than the outer diameter of the drive shaft 3. Further, because of the need to restrict the axial movement of the drive shaft 3 within a prescribed range at an open end of the yoke 1, and the need to seal the annular gap between the open end of the yoke 1 and the outer circumferential surface of the drive shaft 3, the inner diameter of the open end of the yoke 1 was conventionally smaller than the outer diameter of the ball nut. Therefore, conventionally, there was some difficulty in directly measuring the output torque of the electric motor. To overcome this difficulty, conventionally, the thrust force of the drive shaft 3 was measured instead of directly measuring the output torque of the electric motor.

However, the thrust force of the drive shaft 3 does not necessarily represent the output torque of the electric motor because of the friction loss in the ball nut mechanism, manufacturing errors in the ball nut mechanism, and the machining errors in the drive shaft. Therefore, conventionally, to be able to accurately determine the torque output of an electric motor for an electric power steering device of this type, it was necessary either to measure the mechanical loss that may be present in the ball nut mechanism or to test the motor armature in a special jig incorporated with permanent magnets and a yoke. In either case, extra preparatory steps and extra testing steps must be added to the manufacturing process, and this leads to the reduction in the manufacturing efficiency. Also, the test precision may still not be very high because of a number of factors which arise from the fact that the motor output torque has to be measured indirectly.

BRIEF SUMMARY OF THE INVENTION

In view of such problems of the prior art, a primary object of the present invention is to provide an improved electric power steering device which allows a motor output torque or a rotational speed thereof to be measured directly.

A second object of the present invention is to provide an electric power steering device which is adapted for an efficient manufacturing process.

A third object of the present invention is to provide an electric power steering device which allows an electric motor thereof to be tested in a highly accurate manner.

According to the present invention, these and other objects can be accomplished by providing an electric power steering device, comprising: a yoke made of a tubular member, and carrying magnetic field generating means on an inner circumferential surface thereof; a hollow motor shaft coaxially and rotatably received in the yoke, and carrying a motor armature which cooperates with the magnetic field generating means to form an electric motor for the power steering device; a drive shaft coaxially and axially slidably received in the hollow motor shaft, and provided with a threaded section; and a threaded nut mechanism including a nut member which is coaxially and fixedly secured in the hollow motor shaft and threadably engages with the threaded section of the drive shaft so as to convert a rotational movement of the motor shaft into an axial movement of the drive shaft; wherein a section of the yoke extending from a part thereof surrounding an axial end of the motor shaft adjacent to the threaded nut mechanism to an adjacent axial end of the yoke defines an inner diameter which is greater than an outer diameter of the nut member.

Thus, the output torque of the electric motor can be measured during the course of assembling the power steering device by allowing a testing tool to be inserted from the open end of the yoke without any interference and to be applied to a suitable part of the nut member or the motor shaft. It means that the performance of the electric motor can be directly evaluated before the power steering device is fully assembled so that any faulty electric motor can be either rejected or repaired before any further assembling work is conducted. In either case, a substantial gain in the manufacturing cost can be achieved by minimizing the wasteful use of labor and material.

The magnetic field generating means comprises either electromagnetic coils or permanent magnets. Typically, to minimize the frictional resistance in the threaded nut mechanism, a plurality of steel balls are received in a spiral passage defined by a threaded section formed in an inner circumferential surface of the nut member, and the threaded section of the drive shaft.

According to a preferred embodiment of the present invention, the hollow motor shaft comprises a nut retaining portion having a slightly enlarged diameter for receiving the nut member therein in a rotationally fast manner. Typically, the nut member is secured in the axial direction by an annular lock member fitted in an open end of the nut retaining portion, and in the circumferential direction by an engagement portion typically consisting of an inwardly directed radial projection. The annular lock member may consist of a lock nut which may be threaded into the nut retaining portion. The nut member may be provided with cooperating engagement means such as a radial slot which is adapted to receive the radial projection.

The open end of the yoke has such a large inner diameter that it can accommodate a testing tool which may be inserted into the yoke without encountering any interference, and engaged to a part of the motor shaft so that the output torque and/or the angular position of the motor shaft can be accurately measured by a measuring instrument connected to the other end of the testing tool.

To this end, the engagement portion may comprise a plurality of axial holes which are adapted to be engaged by axial pins formed in the testing tool. In this case, the motor can be tested as soon as the nut member is secured inside the nut retaining portion of the motor shaft. Alternatively, when the nut retaining portion is provided with an inwardly directed radial projection, the testing tool may be fitted into the nut retaining portion, and coupled to the motor shaft in a rotationally fast manner by means of a radial slot provided in the testing tool for receiving the radial projection. In this case, the motor can be tested even before the nut member is secured inside the motor shaft.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
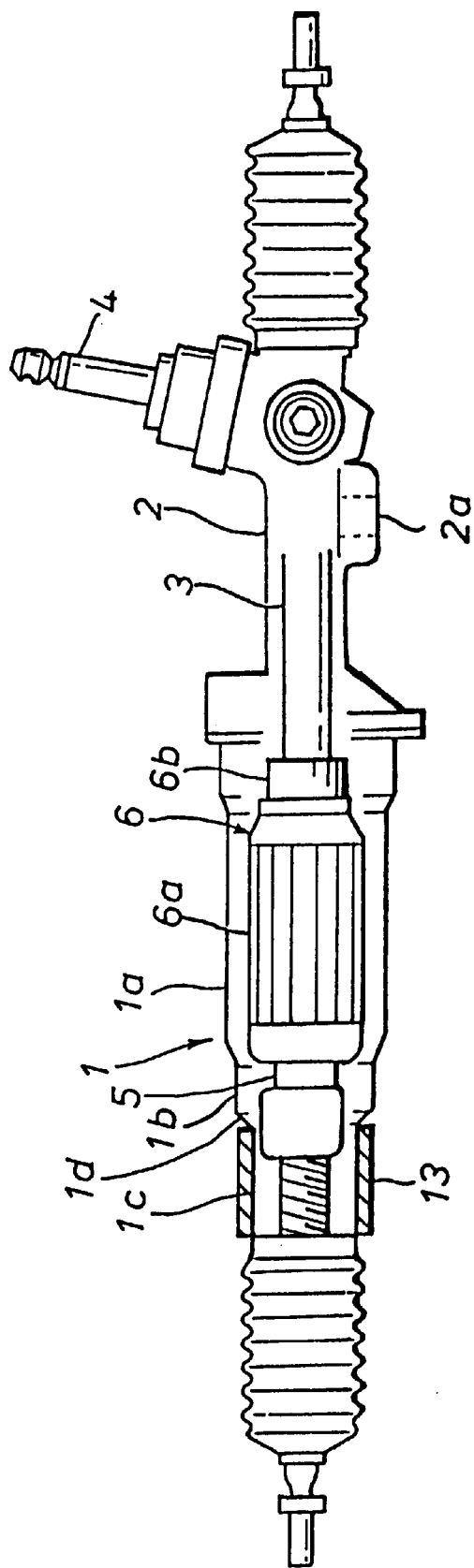
FIG. 1 is a simplified view of an electric power steering device to which the present invention is applied.
Figure 2:
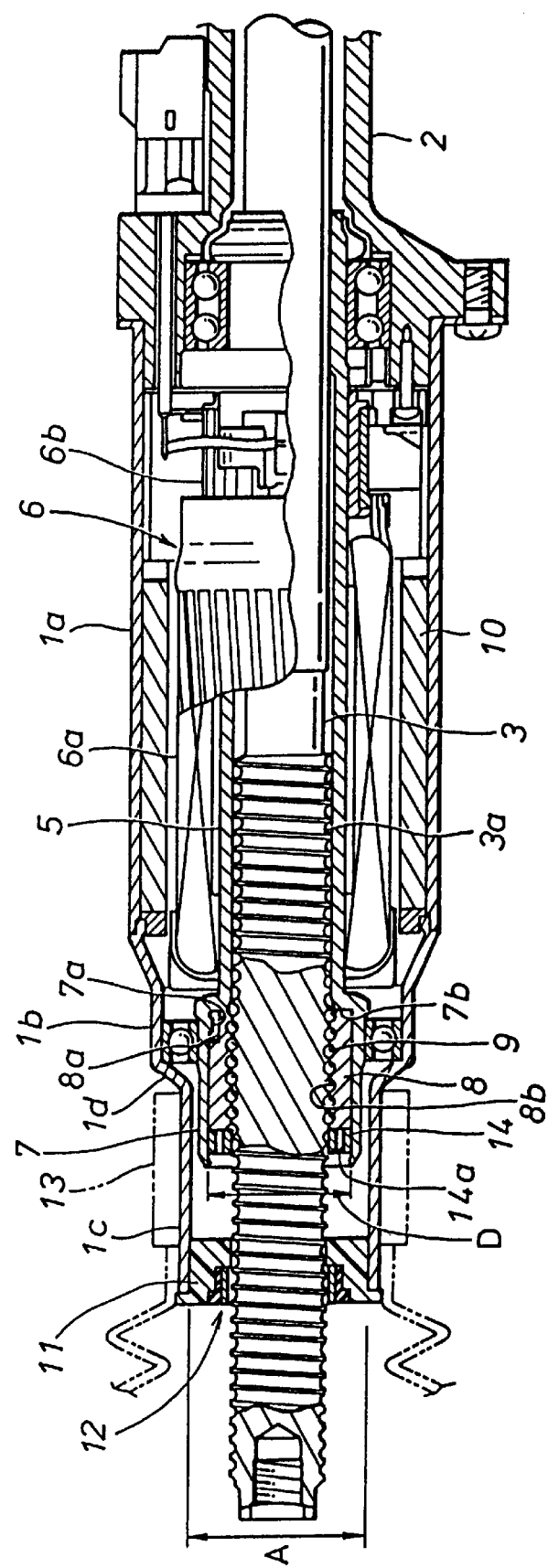
FIG. 2 is an enlarged view of a part of FIG. 1 showing a first embodiment of the present invention.

FIG. 1 generally illustrates a first embodiment of the present invention, and the parts corresponding to those of the prior art are denoted with like numerals. Referring to FIG. 2 which shows a part of FIG. 1 in more detail, an armature core 6a is fixedly secured to an intermediate part of the outer circumferential surface of the hollow motor shaft 5, and the motor shaft 5 is provided with an end portion having a somewhat enlarged outer diameter so as to serve as a nut retaining portion 7 which coaxially and fixed receives a ball nut 8 therein. The ball nut 8 is axially positioned inside the nut retaining portion 7 by abutting an outward facing annular shoulder 7b formed in the nut retaining portion 7, and is retained in this position by threading a lock nut 14 into the nut retaining portion 7 by means of inner and outer threads formed in the inner circumferential surface of the nut retaining portion 7 and the outer circumferential surface of the lock nut 14, respectively, and crimping a free end of the nut retaining portion 7 against the outer end surface of the lock nut 14. The inner circumferential surface of the nut retaining portion 7 is provided with a radial projection 7a which fits into a corresponding slot 8a provided in the ball nut 8 to secure the ball nut 8 rotationally fast to the nut retaining portion 7.

A part of the outer circumferential surface of the drive shaft 3 is formed with a spiral thread groove 3a, and the inner circumferential surface of the ball nut 8 is provided with a corresponding spiral thread groove 8b so that these thread grooves 3a and 8a define a spiral passage for receiving a plurality of steel balls 9 therein. This ball nut mechanism allows the rotational movement of the nut 8 or the motor shaft 5 to be converted into the axial movement of the drive shaft 3 in a relatively friction free manner.

The yoke 1 comprises a main portion or a large diameter portion 1a having permanent magnets 10 attached thereto, a shaft supporting portion 1b which is reduced in diameter and has a bearing fitted therein for rotatably supporting the nut retaining portion 7. The shaft supporting portion 1b has a uniform diameter, and is connected to the large diameter portion 1a via a frustoconical tapering section. A small diameter portion 1c which is even further reduced in diameter than the shaft supporting portion 1b is connected to the other end of the shaft supporting portion 1b via another frustoconical tapering section 1d. The small diameter portion 1c extends axially from an extreme free end of the yoke 1 to a point of the yoke 1 surrounding the nut retaining portion 7, and has a uniform diameter.

An annular end piece 11 made of plastic material is press fitted into the open end of the small diameter portion 1c, and the inner circumferential surface of the end piece 11 is provided with a stopper 12 consisting of a metallic sleeve closely surrounding the drive shaft 3 and fixed to the inner surface of the end piece 11 via an annular rubber member. The stopper 12 restricts the axial movement of the drive shaft by a part of the knuckle arm (not shown in the drawing) attached to the drive shaft 3 abutting the stopper 12 when the steering wheel is turned all the way in either direction. A bracket 13 is passed around the small diameter portion 1c of the yoke 1 to secure the yoke 1 to the vehicle body.

Figure 3:
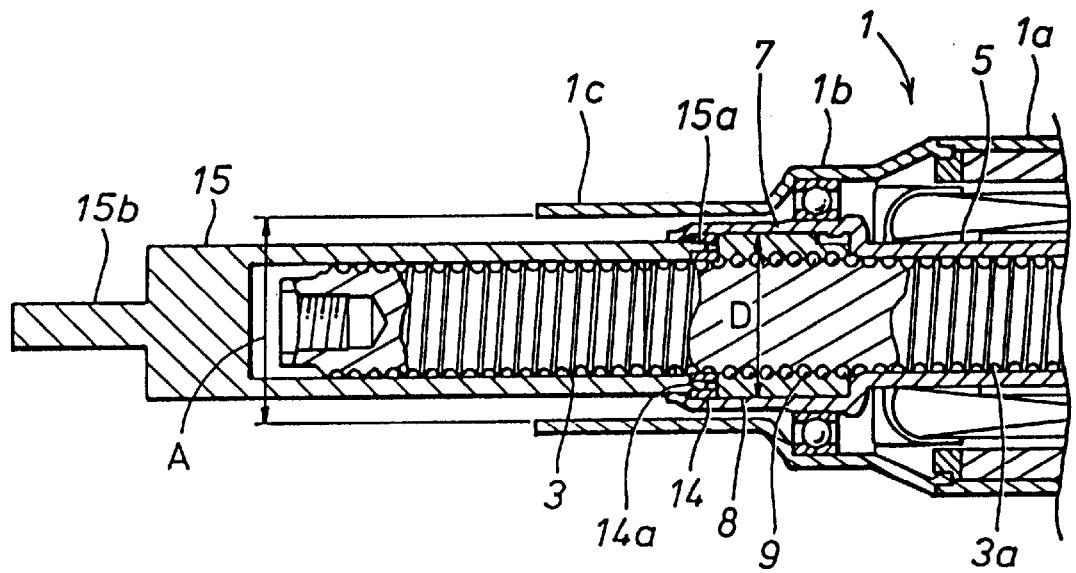
FIG. 3 is a view showing the first embodiment when the testing tool is applied to the motor output shaft.
Figure 4:
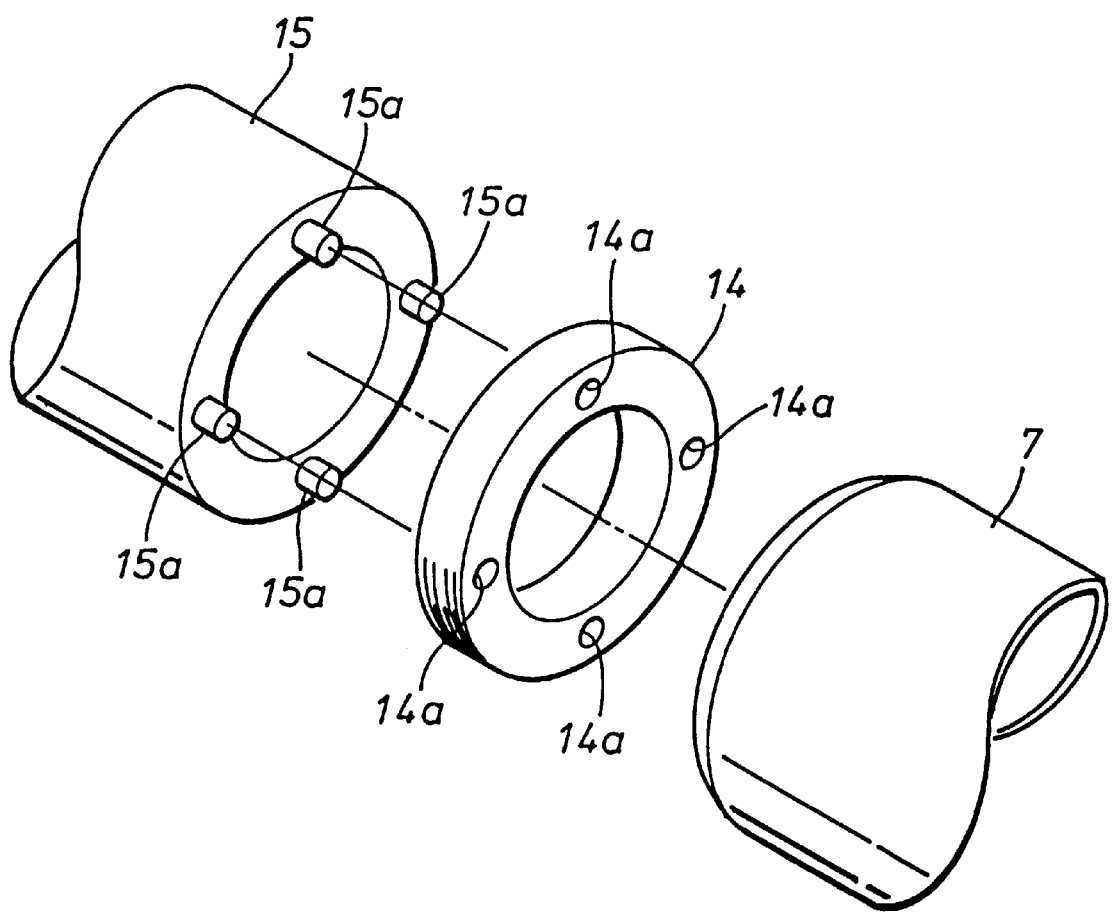
FIG. 4 is a fragmentary perspective view of the testing tool used in the first embodiment of the present invention.
Figure 6:
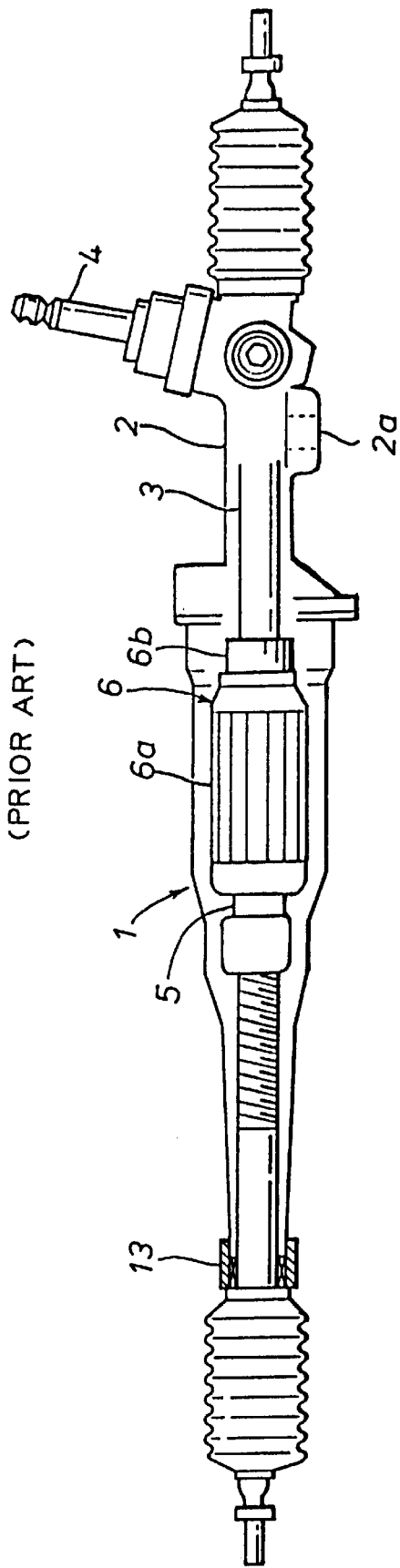
FIG. 6 is a simplified view showing a conventional electric power steering device.

The electric motor of this steering device can be tested after the ball nut 8 and the lock nut 14 are assembled to the nut retaining portion 7, and the outer end of the nut retaining portion 7 is crimped against the lock nut 14. A testing tool 15 having a cylindrical form is then applied to the lock nut 14 as illustrated in FIG. 3. The outer diameter of this testing tool 15 is slightly smaller than the outer diameter of the nut retaining portion 7. The lock nut 14 is provided with a plurality of axial holes 14a arranged along a concentric circle, and corresponding pins 15a which are adapted to be fitted into the axial holes 14a project from an axial end of the testing tool 15 as best illustrated in FIG. 4. Thus, the testing tool 15 may be applied to the lock nut 14 so as to fit the pins 15a into the axial holes 14a with the result that the nut retaining portion 7 and the testing tool 15 can be joined in a rotationally fast manner.

The outer end of the testing tool 15 is provided with an engagement projection 15b which is adapted to be connected to a measuring instrument not shown in the drawing so that the torque output and/or the rotational speed of the electric motor can be measured directly. In particular, because the fastening torque of the lock nut 14 is made greater than the output torque of the electric motor, the test of the electric motor can be carried out without any loosening of the lock nut 14.

The small diameter portion 1c of the yoke 1 has a uniform diameter from a part thereof surrounding the nut retaining portion 7 to the open end thereof fitted with the end piece 11. Therefore, the outer diameter D of the ball nut 8 fitted into the nut retaining portion 7 is smaller than the inner diameter A of the small diameter portion 1c. Therefore, the testing tool 15 having a substantially same outer diameter as the nut retaining portion 7 can be placed into the nut retaining portion 7 from the open end of the small diameter portion 1c without being interfered by the yoke 1 or any other part of the power steering device.

Because the end piece 11 for restricting the axial movement of the drive shaft 3 is made of a separate component, instead of forming it from a part of the yoke 1, it is possible to give a sufficient thickness to the end piece 11, and to allow the yoke 1 to have a small thickness. Therefore, the manufacturing process can be simplified, and the manufacturing cost can be reduced.

Figure 5:
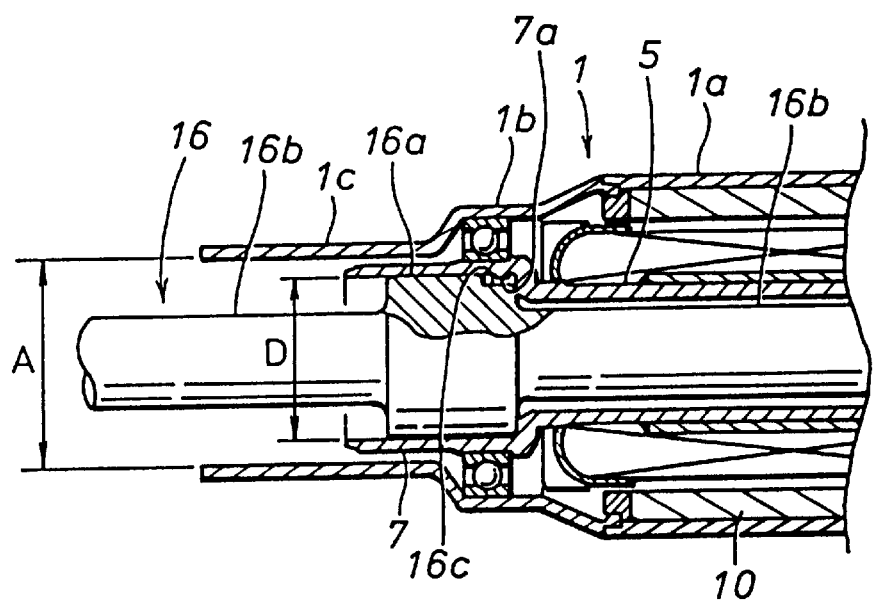
FIG. 5 is a view similar to FIG. 3 showing a second embodiment of the present invention.

FIG. 5 shows a second embodiment of the present invention. According to the second embodiment of the present invention, a testing tool 16 as illustrated in FIG. 5 is fitted into the hollow motor shaft 5 before the ball nut 8 is fitted into the nut retaining portion 7.

The testing tool 16 consists of an elongated rod, and has an intermediate part which is formed as a large diameter portion 16a having a substantially same diameter as the ball nut 8, and is therefore adapted to be fitted into and out of the nut retaining portion 7 without any undue frictional resistance. The shaft portions 16b extend in either axial direction from the large diameter portion 16a, and have a substantially same diameter as the drive shaft 3. An axial end portion of the large diameter portion 16a of the testing tool 16 is provided with a radial slot 16c which is adapted to receive a corresponding projection 7a formed inside the nut retaining portion 7 so that the testing tool 16 may be selectively joined with the nut retaining portion 7 or the motor shaft 5 in a rotationally fast manner.

Once the testing tool 16 is fitted inside the motor shaft 5 as described above, in place of the drive shaft 3, and an outer axial end of the extension shaft 16b is connected to a measuring instrument not shown in the drawing, it becomes possible to directly measure the output torque and/or the rotational speed of the electric motor. Therefore, the performance of the electric motor can be tested directly during the course of the assembly work.

The large diameter portion 16a of the testing tool 16 of this embodiment has a substantially same outer diameter as the ball nut 8 so that the large diameter portion 16a can be fitted into the small diameter portion 1c of the yoke 1 from the open end thereof, and engage the nut retaining portion 7 without any difficulty.

Thus, according to the present invention, once the yoke is assembled, it is possible to fit the testing tool inside the yoke, and engage the testing tool with the nut retaining portion of the motor output shaft. Therefore, it is possible to test the performance of the electric motor during the course of the assembly work, or before the power steering device is fully assembled, by directly measuring the output torque or the rotational speed of the electric motor. Therefore, the present invention allows the efficiency of the manufacturing process to be improved by rejecting or correcting any faulty electric motor before the power steering device is fully assembled. In particular, this testing process can be carried out without substantially modifying the existing assembly process.

Although the present invention has been described in terms of preferred embodiments thereof, it is obvious to a person skilled in the art that various alterations and modifications are possible without departing from the scope of the present invention which is set forth in the appended claims.

What we claim is:

1. An electric power steering device, comprising:
    a yoke made of a tubular member, and carrying magnetic field generating means on an inner circumferential surface thereof;
    a hollow motor shaft coaxially and rotatably received in said yoke, and carrying a motor armature which cooperates with said magnetic field generating means to form an electric motor for the power steering device;
    a drive shaft coaxially and axially slidably received in said hollow motor shaft, and provided with a threaded section; and
    a threaded nut mechanism including a nut member which is coaxially and fixedly secured in said hollow motor shaft and threadably engages with said threaded section of said drive shaft so as to convert a rotational movement of said motor shaft into an axial movement of said drive shaft, wherein a section of said yoke extending from a part thereof surrounding an axial end of said motor shaft adjacent to said threaded nut mechanism to an adjacent axial end of said yoke defines an inner diameter such that said inner diameter of said section is greater than an outer diameter of said nut member over the entire length of said section.

2. An electric power steering device according to claim 1, wherein said magnetic field generating means comprises permanent magnets.

3. An electric power steering device according to claim 1, wherein said threaded nut mechanism includes a plurality of balls received in a spiral passage defined by a threaded section formed in an inner circumferential surface of said nut member, and said threaded section of said drive shaft.

4. An electric power steering device according to claim 1, wherein said hollow motor shaft comprises a nut retaining portion having a slightly enlarged diameter for receiving said nut member therein in a rotationally fast manner.

5. An electric power steering device according to claim 4, further comprising an annular lock member fitted in an open end of said nut retaining portion for axially securing said nut member in said nut retaining portion, and said annular lock member comprises an engagement portion which is adapted to be engaged by a testing tool.

6. An electric power steering device according to claim 5, wherein said engagement portion comprises a plurality of axial holes which are adapted to be engaged by axial pins formed in the testing tool.

7. An electric power steering device according to claim 5, wherein said annular lock member comprises a lock nut having an outer thread adapted to be engaged by a corresponding inner thread formed in an inner circumferential surface of said nut retaining portion.

8. An electric power steering device according to claim 4, wherein said nut retaining portion is provided with an engagement portion which is adapted to engage both said nut member and a testing tool in a rotational fast manner.

9. An electric power steering device according to claim 8, wherein said engagement portion comprises an inwardly directed radial projection.

* * * * *